April 21, 1970 M. A. DUGUAY ET AL 3,508,208

OPTICAL ORGANIC MEMORY DEVICE

Filed Dec. 27, 1967 2 Sheets-Sheet 1

INVENTORS M. A. DUGUAY
P. M. RENTZEPIS

BY David P. Kelley

ATTORNEY

United States Patent Office 3,508,208
Patented Apr. 21, 1970

3,508,208
OPTICAL ORGANIC MEMORY DEVICE
Michel A. Duguay, Berkeley Heights, and Peter M. Rentzepis, Millington, N.J., assignors to Bell Telephone Laboratories, Incorporated, Murray Hill, N.J., a corporation of New York
Filed Dec. 27, 1967, Ser. No. 693,872
Int. Cl. G11c *13/02;* H01s *3/00;* C09k *1/02*
U.S. Cl. 340—173 10 Claims

ABSTRACT OF THE DISCLOSURE

An optical memory device includes a two-photon fluorescent medium which has been solidified (e.g., frozen or dispersed in a polymer). Information is written into a selected region of the medium when a pair of picosecond pulses are made to be coincident and to overlap within the selected region. The overlapping pulses create, by two-photon absorption, orgnaic free radicals which store the information at an energy level intermediate the fluorescent level and the ground state. The radicals store indefinitely the desired information which may be read out by interrogating the medium with a second pair of coincident and overlapping picosecond pulses. In the case where the medium is frozen, interrogation may also be accomplished by directing a collimated infrared light beam into the selected region thereby causing that region to liquefy and its associated radicals to undergo recombination. In each of the aforementioned cases, the interrogate beam causes the interrogated region to fluoresce, the radiation emitted being sensed by an appropriate light detector.

BACKGROUND OF THE INVENTION

This invention relates to memory devices and more particularly to optical memory devices which utilize solidified two-photon fluorescent mediums.

Recent advances in technology, notably the development of the laser, have brought feasible optical communications systems nearer to reality. Notable developments in the laser art, including synchronous modulation and Q-switching, have made it possible to phase-lock the oscillating modes of a laser. The output of a phase-locked laser is a pulse train having a pulse repetition rate given by $c/2L$, where $c$ is the velocity of light and L is the length of the active medium. More importantly, however, the pulses generated are typically in the picosecond range. Such pulses, which are also produced by stimulated Raman emission, are ideally suited to serve as the carrier for an optical pulse code modulation system. The pulse train may be encoded by the elimination of selected ones of the pulses in accordance with logical information to be transmitted. As with most communictions systems, however, a memory is needed to store the encoded information, and methods must be developed to access that information. In particular, in an optical memory system it is desirable to have a bistable optical memory device which can be controlled by light beams. In the case where the pulse train is generated by a mode-locked laser, for example, the pulse spacing may be of the order of several hundred picoseconds and the pulse width may be only fractions of a picosecond. The memory device to function as described, therefore, must be responsive to pulses of picosecond duration.

In order that large quantities of information might be stored in a small area, each memory cell should be small in size and the device as a whole should be readily fabricated.

SUMMARY OF THE INVENTION

The basic functions performed by any memory system include writing, read-out and, of course, memory. In the optical memory in accordance with the present invention the writing and read-out functions may be performed by one or more light beams. In particular, both of the latter functions may be performed by a pair of picosecond pulses having different frequencies and different intensities which are made to overlap and to be coincident within a selected region (memory cell) of the medium. As will be described more fully hereinafter, this technique allows a selected region, the region in which the pulses are coincident and overlap, to be addressed without addressing any other region. The ability to address selected regions is particularly important in a three-dimensional memory in which it may be desirable to address a memory cell at the center of a memory cube. The memory function is performed by utilization of a solidified two-photon fluorescent medium. Information is written into a selected region of the medium when a pair of picosecond pulses are made to be coincident and to overlap within the selected region. The overlapping pulses create, by two-photon absorption, organic free radicals which store the information at an energy level intermediate the fluorescent level and the ground state. The radicals store indefinitely the desired information which may be read out by interrogating the medium with a second pair of coincident and overlapping picosecond pulses. In the case where the medium is frozen, interrogation may also be accomplished by directing a collimated infrared light beam into the selected region, thereby causing that region to liquefy and its associated radicals to undergo recombination. In each of the aforementioned cases, the interrogate beam causes the interrogated region to fluoresce, the radiation emitted being sensed by an appropriate light detector.

BRIEF DESCRIPTION OF THE DRAWINGS

The invention, together with its various features and advantages, can be easily understood with reference to the following more detailed description taken in conjunction with the accompanying drawings, in which.

DETAILED DESCRIPTION

Figures 1, 2:
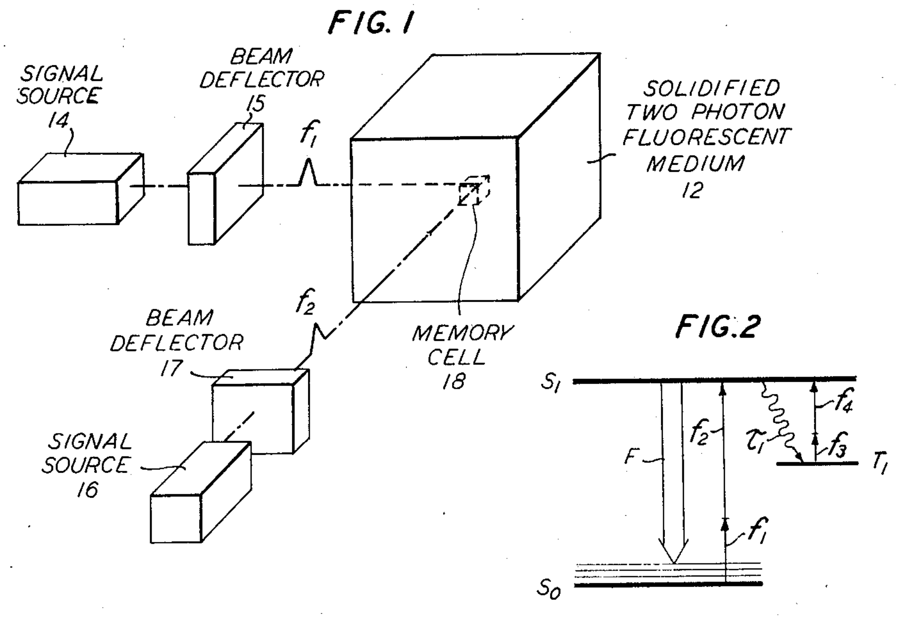
FIG. 1 is a schematic of an illustrative embodiment of the invention.
FIG. 2 is a schematic showing a portion of an energy level system of a medium used in accordance with the invention.

Turning now to FIG. 1, there is shown a three-dimensional memory system comprisng a solidfied two-photon fluorescent medium 12 which may be divided into a plurality of imaginary memory cells such as that designated 18. The outputs of a pair of signal sources 14 and 16 are directed respectively through beam deflectors 15 and 17 into the medium 12 so as to intercept one another in memory cell 18. The signal sources are typically lasers which generate pulses of picosecond duration by any of several well-known techniques including synchronous modulation and Q-switching.

In order to exhibit memory, as will be explained more fully hereinafter, the medium 12 is solidfied; that is, it is frozen (e.g., maintained at liquid helium temperatures), or it is dispersed in a solid (e.g., polymerized). In both cases information is written into a selected memory cell (e.g., cell 18) by causing a pair of picosecond pulses to be coincident and to overlap within cell 18. The overlapping pulses create, by two-photon absorption, organic free radicals which store the information at an energy level intermediate the fluorescent level and ground state of the medium 12. Several modes of read-out may be employed, however. In the case where the medium is frozen, interrogation (read-out) may be accomplished by directing a collimated infrared light beam into the memory cell 18. In the case where the medium is either polymerized or frozen, interrogation may be accomplished by causing a second pair of picosecond pulses (which may also be generated by sources 14 and 16) to be coincident and to overlap within the cell 18. In each case, the interrogate beams cause the cell 18 to fluoresce, the radiation emitted being sensed by appropriate light detectors, not shown.

TWO-PHOTON FLUORESCENCE

The present invention employs a medium which requires the absorption of two photons to produce each quantum of fluorescent radiation. Note, however, that fluorescence is not directly produced by the absorption of two photons, rather, since the medium is solidfied, free radicals are created in a memory state. These radicals may later be excited (read-out) to produce a fluorescent output. Thus, in the following discussion, although reference is made to fluoresence, the aforementioned qualification should be kept in mind.

In general, detectable fluorescence involves two parameters, frequency and intensity. Frequency is related (by Planck's constant) to the signal energy required to excite electrons across the energy gap of the medium employed. Intensity, on the other hand, is related to the total number of photons supplied by an incident signal. Signal intensity is therefore related to the total number of photons absorbed by the medium which in turn is a measure of the fluorescent intensity produced. Thus, a signal may fail to produce detectable fluorescence either because its frequency is too low to excite electrons across the gap, or although it may have the proper frequency, because its intensity is too low to cause the medium to absorb a sufficient number of photons. These two properties are exploited in the writing and read-out functions of the present invention. In addition, a signal with both the proper frequency and proper intensity may still not produce detectoble fluorescence because, as mentioned previously, the medium is solidified so that the radicals of the medium are not free to move and hence not free to undergo recombination. The latter property is utilized in the present invention to realize the memory function.

Normally, then, by an appropriate choice of the frequencies and intensities of a pair of pisosecond pulses, detectable fluorescent radiation would be produced in the region where the signals are coincdient and overlap (e.g., cell 18), one photon being absorbed from each of two signals per quantum of fluorescent radiation. Inasmuch as the medium 12 is solidfied, however, the overlapping pulses which perform the writing function do not produce fluorescence at all, rather they create free radicals which store the information at an energy level intermediate the energy gap. The information is read out by a second pair of coincident and overlapping picosecond pulses which excite the radicals to a higher energy state and subsequently produce detectable fluorescence.

WRITING, READ-OUT AND MEMORY MECHANISMS

Figures 3, 4, 5:
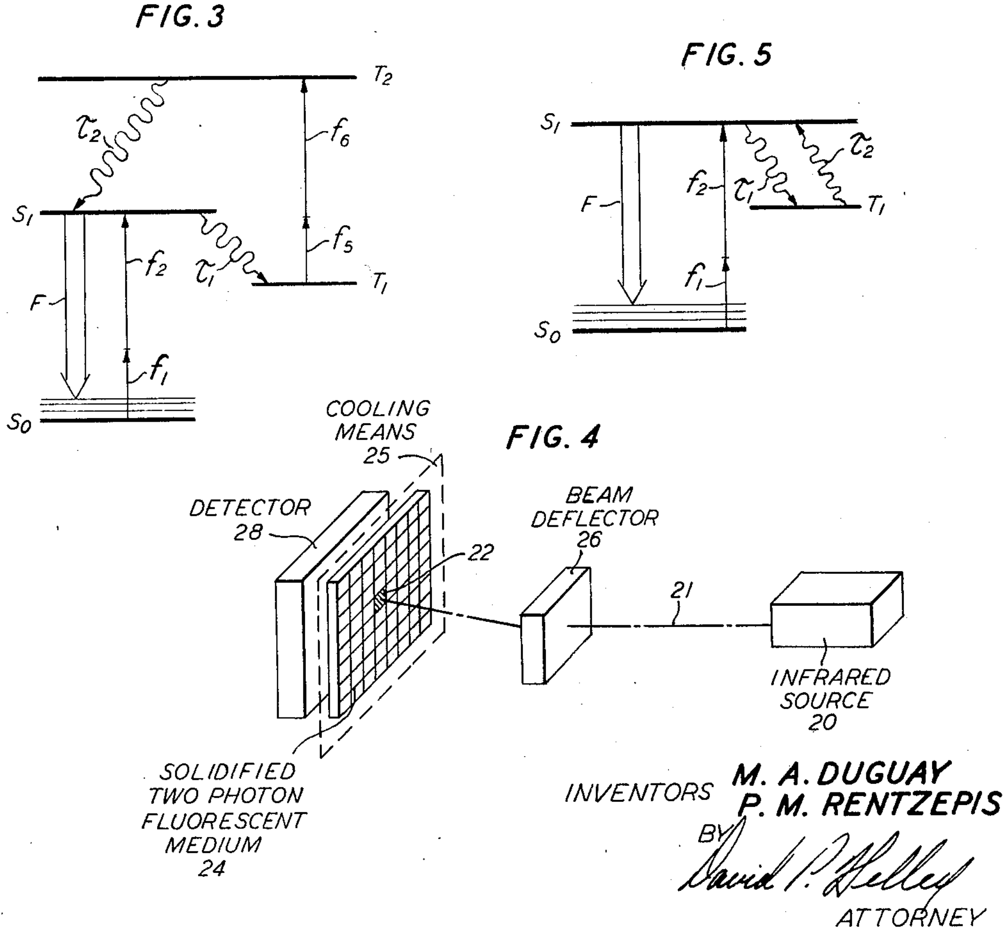
FIG. 3 is a schematic showing a portion of another energy level system of a medium used in accordance with the invention.
FIG. 4 is a schematic of another embodiment of the invention.
FIG. 5 is a schematic showing a portion of the energy level system of a medium used in accordance with the invention as shown in FIG. 4.

The atomic mechanism by which the writing, read-out and memory functions are performed can be understood more fully with reference to FIGS. 2 and 3. Turning now to FIG. 2, there is shown schematically a portion of the energy level system of a two-photon fluorescent medium characterized by a pair of singlet states $S_0$ and $S_1$, separated by an energy gap $E_g$. In order to write information into a selected memory cell, two pulses of different frequencies and intensities are caused to overlap and to be coincident within that cell. As a result, electrons within that cell are excited from $S_0$ to $S_1$, but because the medium is solidified, the excited electrons do not fall back to $S_0$ and produce fluorescence. Rather, they undergo a nonradiative transition $\tau_1$ to memory state $T_1$ (because the transition $S_1 \rightarrow T_1$ is much more probable than the transition $S_1 \rightarrow S_0$), and produce free radicals in that triplet state. The radicals, however, do not recombine because the medium is solidified. The information stored by the radicals is read out by exciting the radicals from $T_1$ to $S_1$, which subsequently causes electrons to fall from $S_1$ to one of the vibrational levels of $S_0$, thereby producing detectable fluorescence F.

More specifically, one of the pulses has optical frequency $f_1$ and intensity $I_1$ and the other has optical frequency $f_2$ and intensity $I_2$. Typically, $f_1=2f_2$, $f_2$ being produced by a well-known second harmonic generator (e.g., a KDP crystal). The pulse at $f_1$ is made to be such that the absorption of two photons from it alone does not excite electrons across the energy gap; that is, $2hf_1<E_g$). On the other hand, the pulse at $f_2$ is made to be such that the absorption of two photons from it alone does excite electrons across the gap (i.e., $2hf_2>E_g$), but an insignificant number thereof. This is accomplished by maintaining its intensity low, typically $I_2 \infty I_1/100$. Thus, neither pulse alone excites a significant number of electrons from $S_0$ to $S_1$ and consequently neither produces a significant number of radicals in memory state $T_1$. Where, however, the signals are coincident and overlap within the medium, both the conditions of frequency and intensity are met. That is, the energy of the combined signals is sufficient to excite electrons acros the gap since $$h(f_1+f_2)>E_g$$

and, the intensity of the combined signals produces a total number of radicals in memory state $T_1$ such that when excited, directly or indirectly, to state $S_1$ detectable fluorescence subsequently results. In summary, then, where the two signals are coincident and overlap, information is stored by organic free radicals in memory state $T_1$ intermediate $S_0$ and $S_1$. But where the signals do not overlap, or are not coincident, no information is stored.

Information stored by free radicals in memory state $T_1$ in either type of solidified medium is read out in a manner analogous to the writing technique. Two optical pulses of different frequencies $f_3$ and $f_4$ (see FIG. 2) and different intensities are made to be coincident and to overlap within the memory cell to be read out. The frequencies are such that the total energy of the pulses $h(f_3+f_4)$ is substantially equal to the energy separation of $T_1$ and $S_1$. However, the invention is a broadband device inasmuch as each energy state is really a group of closely packed states having substantially the same energy. Typically, each "state" covers a band several hundred angstrom units wide. Thus, within a tolerance of hundreds of angstrom units, the sum of frequencies is not critical. The two frequency-two intensity scheme is the same as that previously described for the writing function. The coincident and overlapping pulses cause the free radicals to be excited from $T_1$ to $S_1$ and subsequently cause electrons thereby excited to $S_1$ to fall to one of the vibrational levels of $S_0$ accompanied by fluorescence F. The fluorescent output F is sensed by an appropriate optical detector as logical "1." If no detectable fluorescence is produced (i..e, if an insignificant number of free radicals were in the memory state $T_1$) the detector would read logical "0."

An alternate read-out mechanism for both types of solidified mediums is shown in FIG. 3. Information stored by free radicals in memory state $T_1$ is read out by exciting the free radicals from $T_1$ to an energy level $T_2$ above the band gap. Electrons thus excited to $T_2$ undergo a nonradiative transition $\tau_2$ to $S_1$ and subsequently fall to one of the vibrational levels of $S_0$ accompanied by fluorescence F. Again, read-out is accomplished by utilization of the two frequency-two intensity technique; two optical pulses of different frequencies ($f_5$ and $f_6$) and different intensities are made to be coincident and to overlap within the memory cell to be read out. The frequencies are such that the energy $h(f_5+f_6)$ is substantially equal to the energy separation of states $T_1$ and $T_2$. As described previously, however, the device is broadband and hence the sum of the frequencies is not critical within a tolerance of several hundred angstrom units. It is to be noted that both of the aforementioned read-out mechanisms need not involve destructive read-out. That is, the information in a memory cell can be retained there while simultaneously being read out. One manner of accomplishing nondestructive read-out would be to control the intensity of the read-out pulses such that only a portion of the free radicals in a memory cell are excited, thus leaving to the remainder to be read out at subsequent times. Alternatively, all or part of the free radicals may be excited, but by use of feedback techniques the information read out can be utilized to restore the information to the memory cell.

Read-out of a frozen medium, on the other hand, may be accomplished without the use of a two frequency-two intensity scheme. For example, as shown in FIG. 4, a collimated infrared source 20 (e.g., a $CO_2$ laser or a collimated infrared lamp) generates an infrared beam 21 that can be made incident upon the memory cell 22 of a frozen two-photon fluorescent medium 24 by passing the beam through a beam deflector 26. The medium 24 is maintained frozen by an appropriate cooling means 25 (shown schematically) well known to those skilled in the art. An appropriate photodetector 28 is positioned with relation to the medium 24 so as to detect the presence or absence of a fluorescent output from each memory cell. The infrared beam produces local heating in the selected memory cell thereby to cause the medium within that cell to liquefy. As a result, the free radicals in the cell recombine and thereby undergo, as shown in FIG. 5, a nonradiative transition $\tau_2$ from memory state $T_1$ to state $S_1$. Electrons excited to $S_1$ subsequently fall to one of the vibrational levels of $S_0$ accompanied by fluorescence F which is sensed by photodetector 28. The medium 24 is shown to be a two-dimensional memory device. The medium could be a three-dimensional memory (as in FIG. 1) in which case the infrared beam 21 would read out sequentially an entire "line" of information (i.e., all memory cells in the path of the beam). The detector 28 in that case should be capable of sensing and distinguishing the sequentially produced read-out information (i.e., logical "1's" and "0's").

Figure 6:
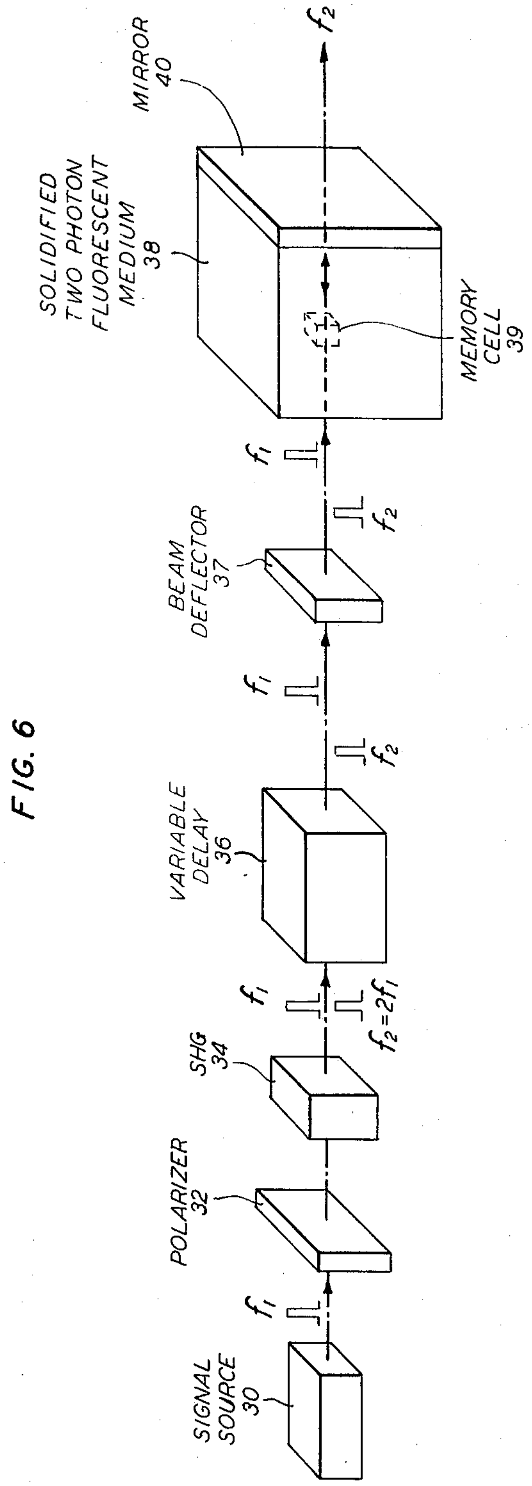
FIG. 6 is a schematic of still another embodiment of the invention.

The previously described writing and read-out techniques employ two signal sources to produce the pair of two frequency- two intensity picosecond pulses. It is possible, however, to generate such a pair of pulses by the utilization of but a single source as shown in FIG. 6. The signal source 30 (e.g., a phase-locked *Nd*:glass laser) generates a picosecond pulse at optical frequency $f_1$ (e.g., $1.06\mu$). The pulse after passing through polarizer 32 enters a second harmonic generator 34 (e.g., a KDP crystal set the phase-matching angle). The output of the generator 34 is a pulse at $f_2=2f_1$ (e.g., $0.53\mu$) as well as a pulse at $f_1$, the intensity of the pulse at $f_1$ being typically 100 times greater than the pulses at $2f_1$ (e.g., 1 G watt/cm.$^2$ as compared to 10 M watt/cm.$^2$). The composite beam is then passed through a frequency sensitive, variable delay means 36 which causes one of the pulses (e.g., the pulse at $f_2$) to be delayed with respect to the other. Both pulses are then passed through a beam deflector 37 which directs the beam into a preselected memory cell 39 of the medium 38. The composite beam passes through the medium and strikes at normal incidence a dielectric mirror 40 which typically reflects the pulse at $f_1$ but transmits the pulse at $f_2$. By inserting the proper amount of delay, the pulse at $f_1$, after being normally reflected from the mirror 40, overlaps and is coincident with the delayed pulse at $f_2$ in the memory cell 39. The overlapping and coincident pulses, as before, create free radicals in a memory state intermediate the energy gap of the medium 38. In a similar manner, this angle source technique may be utilized to read out the stored information.

TWO-PHOTON FLUORESCENT MATERIALS

Typical two-photon fluorescent mediums which may be utilized in accordance with the teaching of the present invention include, for example, anthracene, pyrene and 3,4-benzpyrene which have the following energy level designations in angstrom units measured from the ground state $S_0$.

| Material | $S_1$,A. | $T_1$,A. | $T_2$,A |
|---|---|---|---|
| Anthracene | 2,900–3,700 | ~6,940 | ---------- |
| Pyrene | 2,900–3,500 | ~5,000 | ~3,355 |
| 3,4-benzpyrene | {3,300–4,100 or 2,000–3,000} | ~5,400–6,100 | 3,300–4,100 |

These and other similar materials may be polymerized by, for example, mixing the solid form of the material with a monomer (e.g., paranitrostyrene) and with liquid styrene, and subsequently heating the mixture, a technique well known in the art. To freeze a two-photon material, on the other hand, a $10^{-1}$ to $10^{-4}$ molar solution of the material dissolved in benzene may be lowered to liquid helium temperatures.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, the polymerized medium could be fabricated in tape form to serve as a means of communicating information to, or storing information of, a computer.

What is claimed is:

1. An optical memory device comprising a solidified two-photon fluorescent medium having an energy gap defined by a lower and a higher energy state, the gap being characterized by a radiative transition from the higher to the lower state, means for creating in a region of said medium free radicals at an energy level intermediate the higher and lower states comprising means for causing a pair of pulses having duration of the order of a picosecond or less to coincide and to overlap within said region, and means for producing a radiative transition from the higher to the lower state comprising means for increasing the energy of the free radicals to the level of the higher state.

2. The optical memory device of claim 1 wherein said means for causing a pair of pulses to coincide and to overlap within said region comprises means for generating a first pulse having a frequency such that simultaneous absorption by the medium of two photons from the signal is sufficient to excite electrons from the lower to the higher energy state, and being of an intensity insufficient to produce a significant number of free radicals in the intermediate state, means for generating a second pulse having a frequency such that the simultaneous absorption of two photons from the signal is insufficient to excite electrons from the lower to the higher energy state, and being of high enough frequency and intensity to produce a significant number of free radicals in the intermediate state when the first and second pulses simultaneously overlap within said region of said medium.

3. The optical memory device of claim 1 wherein said means for causing a pair of picosecond pulses to coincide and to overlap within said region comprises means for directing said pulses along a colinear path,
means for delaying one of said pulses with respect to the other,
means directing said pulses into one end of said medium,
a reflector disposed at the other end of said medium normal to said colinear path, thereby to cause said other pulse to reflect from said reflector and to overlap said delayed pulse in said region of said medium.

4. The optical memory device of claim 1 wherein said medium is further characterized by a fourth energy state above the higher energy state and being coupled thereto by a characteristic nonradiative transition, and wherein said means for producing a radiative transition from the higher to the lower energy state comprises means for generating a first picosecond pulse having a frequency such that simultaneous absorption by the medium of two photons from the pulse is sufficient to excite free radicals from the intermediate to the fourth energy state, and being of an intensity insufficient to excite a significant number thereof to the fourth state,
means for generating a second pulse having a frequency such that the simultaneous absorption of two photons from the signal is insufficient to excite free radicals from the intermediate to the fourth energy state, and being of high enough frequency and intensity to excite a significant number thereof to the fourth state when the first and second signals simultaneously overlap within said region of said medium, the electrons in the fourth state thereby undergoing a nonradiative transition from the fourth state to the higher state and subsequently undergoing a radiative transition from the higher state to the lower state.

5. The optical memory device of claim 1 wherein said solidified medium is frozen and wherein said means for producing a radiative transition from the higher to the lower energy states comprises means for directing a collimated infrared beam into said region thereby to liquefy said region and to allow said free radicals to undergo recombination.

6. The optical memory device of claim 1 wherein said solidified medium comprises a two-photon fluorescent material dispersed in a polymer.

7. The optical memory device of claim 1 wherein said solidified medium comprises a frozen liquid solution of a two-photon fluorescent medium.

8. The optical memory device of claim 1 wherein said medium comprises a two-photon fluorescent material selected from the group consisting of anthracene, pyrene and 3,4-benzpyrene.

9. The optical memory device of claim 1 wherein said means for increasing the energy of the free radicals comprises means for causing a second pair of pulses of picosecond duration or less to coincide and to overlap within said region comprising means for generating a first pulse having an optical frequency such that the simultaneous absorption by the region of two photons from the pulse is sufficient to excite free radicals from the intermediate to the higher energy state, and being of an intensity insufficient to excite a significant number of free radicals from the intermediate to the higher energy state, and
means for generating a second pulse having an optical frequency such that the simultaneous absorption of two photons from the signal is insufficient to excite electrons from the intermediate to the higher energy state, and being of high enough optical frequency and intensity to excite a significant number of free radicals from the intermediate to the higher energy state when the pair of pulses simultaneously overlap within said region of said medium.

10. The optical memory device of claim 9 wherein said means for causing a second pair of picosecond pulses to coincide and to overlap within said region comprises means for directing said pulses along a colinear path,
means for delaying one of said pulses with respect to the other,
means directing said pulses into one end of said medium,
a reflector disposed at the other end of said medium normal to said colinear path, thereby to cause said other pulse to reflect from said reflector and to overlap said delayed pulse in said region of said medium.

References Cited

UNITED STATES PATENTS

| | | | |
|---|---|---|---|
| 3,341,825 | 9/1967 | Schrieffer | 340—173 |
| 3,410,624 | 11/1968 | Schmidt | 340—173 X |
| 3,453,429 | 7/1969 | Duguay et al. | 250—71 |

OTHER REFERENCES

Iannuzzi, M., and Polacco, E., "Polarization Dependence of Laser-Induced Fluorescence In Anthracene," Physical Review, vol. 138, n, 3a, May 3, 1965, pp. A806–A808.

BERNARD KONICK, Primary Examiner
J. F. BREIMAYER, Assistant Examiner

U.S. Cl. X.R.

250—71; 252—301.2; 331—94.5